United States Patent [19]

Shimizu et al.

[11] Patent Number: 4,568,093
[45] Date of Patent: Feb. 4, 1986

[54] METHOD OF OPERATING VEHICLE HEIGHT ADJUSTING APPARATUS

[75] Inventors: Yasuo Shimizu; Masaaki Ohshima; Nobuyoshi Asanuma, all of Saitama, Japan

[73] Assignee: Honda Giken Kogyo Kabushiki Kaisha, Tokyo, Japan

[21] Appl. No.: 564,331

[22] Filed: Dec. 22, 1983

[30] Foreign Application Priority Data

Dec. 23, 1982 [JP] Japan .............................. 57-230166
Dec. 24, 1982 [JP] Japan .............................. 57-230314
Jan. 7, 1983 [JP] Japan .................................. 58-1500
Jan. 7, 1983 [JP] Japan .................................. 58-1501

[51] Int. Cl.⁴ ............................................. B60G 13/06
[52] U.S. Cl. .................................... 280/6 R; 280/6 H; 280/702; 180/41
[58] Field of Search .................. 280/6 R, 6.1, 6.11, 280/707, 702, 6 H; 267/64.28; 180/41

[56] References Cited

U.S. PATENT DOCUMENTS 3,768,820 10/1973 Yew ..................................... 280/6 R
3,782,755 1/1974 Spichala ............................. 280/6 R
4,364,574 12/1982 Saito .................................. 280/6 R
4,377,293 3/1983 Senoo ................................ 280/6 R Primary Examiner—Richard A. Bertsch
Attorney, Agent, or Firm—Irving M. Weiner; Joseph P. Carrier; John J. Cantarella

[57] ABSTRACT

A method of operating a vehicle height adjusting apparatus including a vehicle body having front and rear wheels, contractible and extensible dampers disposed between the front and rear wheels and the vehicle body, a motor, a pump unit having inlet and outlet ports and drivable by the motor for supplying a working fluid under pressure to the dampers, a first valve member disposed in a first fluid passage between the pump unit and the dampers for adjusting the height of the vehicle, and a second valve member disposed in a second fluid passage between the inlet and outlet ports of the pump unit and connected to the first fluid passage for discharging the fluid from the dampers to the outlet port of the pump unit. The method comprises the steps of actuating the pump unit, opening the second valve member no later than simultaneously with the actuation of the pump unit, and closing the second valve member a predetermined period of time after it has been opened, whereby the height of the vehicle can be increased.

7 Claims, 8 Drawing Figures

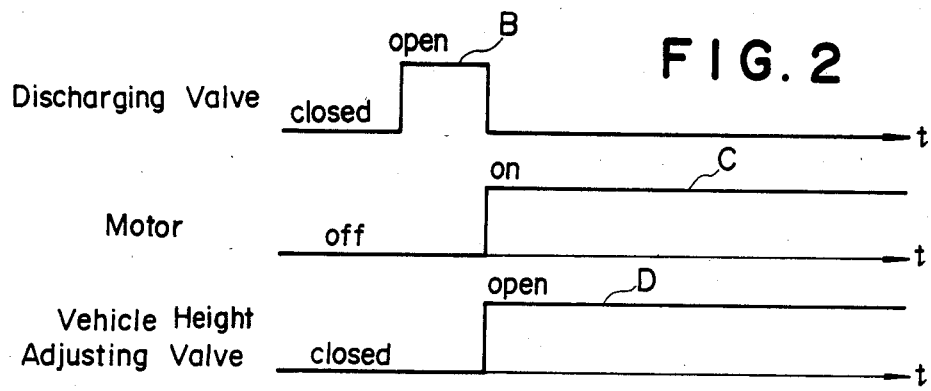
FIG. 2
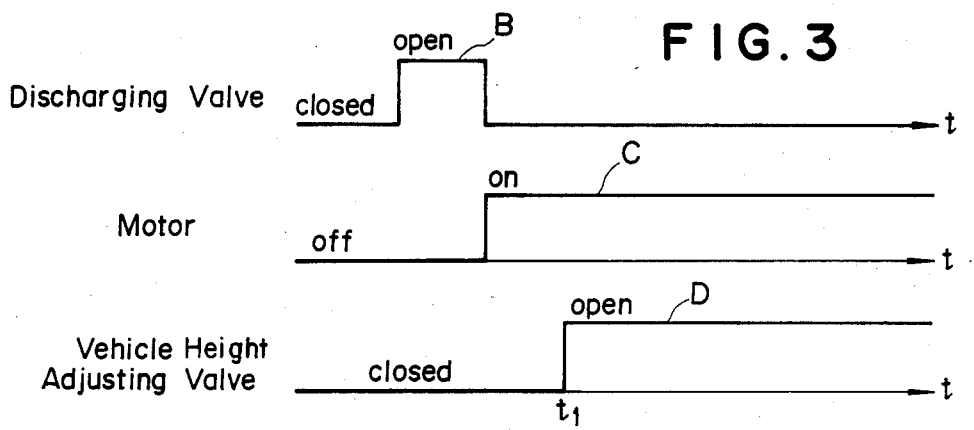
FIG. 3
FIG. 4 (A)
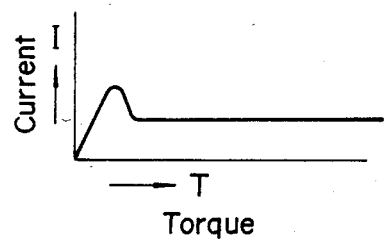
FIG. 4 (B)
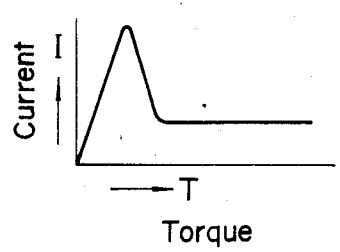

METHOD OF OPERATING VEHICLE HEIGHT ADJUSTING APPARATUS

BACKGROUND OF THE INVENTION

1. Field of the Invention

The present invention relates to a vehicle height adjustment method, and more particularly to a method of operating an apparatus known as a vehicle levelling system, for adjusting the height of a vehicle by supplying a working fluid to or discharging the working fluid from dampers mounted on front and rear portions of the vehicle.

2. Description of the Prior Art

Vehicle height adjusting apparatus serve to keep the height of a vehicle at a reference level at all times through adjustment of the vehicle height irrespectively of a variation in the load on the vehicle. The vehicle height adjusting apparatus maintains the vehicle height at a proper level with respect to the road surface and also varies the suspension capability of the vehicle wheel suspension to give the driver and other passengers good riding comfort. The vehicle height adjusting apparatus generally comprises a pump unit for supplying a working fluid under pressure, such as pressurized air, dampers mounted respectively on wheel suspension units and contractible or extensible to vary the height of the vehicle when the working fluid is discharged from or supplied to the dampers, a fluid system including inlet and outlet ports and valves, and an electric circuit for controlling operation of the pump unit and fluid system. With the conventional vehicle height adjusting apparatus, the working fluid having been used for height adjustment, generally remains under high pressure in a closed space in the fluid passage leading from an outlet port of the pump unit. When the pump unit is started by an electric motor while the fluid is trapped under high pressure in the pump outlet port, the pump unit and the electric motor are subjected to a large load. To avoid this, the electric motor for driving the pump unit is required to be of a large size and have a large capacity. However, electric motors for use on vehicles such as passenger cars fail to meet such a requirement because of limited space and available rigidity of the cars. Another problem is that a large current is required for getting the motor started when it is under a large load, but the pump cannot be started at the time the voltage of the car battery is lowered and no sufficient starting current is available for the motor.

To avoid the problem of the large load imposed on the pump unit and the motor when the working fluid is to be supplied, it has been practiced to open the inlet valve of the pump unit to thereby reduce the load applied thereto. However, such a practice requires a change in the construction and function of the pump unit, and is costly to perform. Furthermore, it is troublesome to change the motor construction and function.

Another proposal has been to reduce the volumetric efficiency of the pump unit for reducing the load applied to the motor when the pump unit is to be started. This is disadvantageous in that the time required for vehicle height adjustment is prolonged, and desired vehicle height adjustment cannot be completed by the time it is needed.

The vehicle height adjusting apparatus of the conventional construction has another difficulty besides the foregoing problems. Where the pump unit is disposed on a front portion of the vehicle, fluid passages connected to the dampers for the rear wheels are longer than the fluid passages joined to the dampers for the front wheels. When the pump unit is actuated and solenoid-operated valves are simultaneously opened to supply the working fluid from the pump unit to the front and rear wheels in order to increase the vehicle height, the fluid flow to the rear wheel dampers is subjected to a larger resistance due to the longer fluid passages and reduced cross-sectional areas thereof selected for increased durability. As a result, the fluid pressures in the front and rear wheel dampers become different, that is, the fluid pressure in the rear wheel dampers is lower than that in the front wheel dampers. The vehicle height as thus adjusted is improper in that the front and rear portions of the vehicle have different heights.

When the rear wheels are subjected to a larger load than the front wheels, for example, and vehicle height adjustment is performed to keep the front and rear vehicle portions at the same level, the fluid pressure in the rear wheel dampers becomes higher than that in the front wheel dampers. Then, the load on the rear wheels is reduced, and the solenoid-operated valves for discharging the fluid from the dampers are simultaneously opened to lower the vehicle height. At this time, the fluid flows under high pressure from the rear wheel dampers to the front wheel dampers, with the result that the vehicle height at the front wheels is temporarily increased.

The present invention effectively eliminates the foregoing shortcomings attendant the conventional apparatus.

SUMMARY OF THE INVENTION

It is an object of the present invention to provide a method of operating a vehicle height adjusting apparatus by supplying a working fluid with a pump unit to dampers to increase the height of a vehicle while reducing a load imposed on the pump unit and a motor actuating the same immediately after the working fluid has started being supplied to the dampers, so that the pump unit can be actuated smoothly and easily by a motor having a small size and a small output capacity.

Another object of the present invention is to provide a method of operating a vehicle height adjusting apparatus while reducing a load imposed on a pump unit and a motor actuating the same simply by varying the operation of components of an existing fluid pressure circuit without altering the pump unit itself.

Still another object of the present invention is to provide a method of operating a vehicle height adjusting apparatus, such that a pump unit employed can be increased in volumetric efficiency for an increased discharging capability or a pump unit can be used which has a greater discharging capability, thereby shortening a time required for vehicle height adjustment.

A still further object of the present invention is to provide a method of operating a vehicle height adjusting apparatus to keep the height of a vehicle at an equalized level at front and rear portions of the vehicle even where fluid passages leading to front and rear wheel dampers have different lengths.

A still further object of the present invention is to provide a method of operating a vehicle height adjusting apparatus to lower the height of a vehicle while keeping a fluid under higher pressure from flowing from either the front or the rear wheel dampers into the other, so that either the front or the rear portions of the vehicle will be prevented from becoming higher than the other portion.

According to the present invention, there is provided a method of operating a vehicle height adjusting apparatus including a vehicle body having having front and rear wheels, contractible and extensible dampers disposed between the front and rear wheels and the vehicle body, a motor, a pump unit having inlet and outlet ports and drivable by the motor for supplying a working fluid under pressure to the dampers, a first valve means disposed in a first fluid passage between the pump unit and the dampers for adjusting the height of the vehicle, and a second valve disposed in a second fluid passage between the inlet and outlet ports of the pump unit and connected to the first fluid passage for discharging the fluid from the dampers to the outlet port of the pump unit, the method comprising the steps of; starting the pump unit to activate same, opening the second valve no later than simultaneously with the starting of actuation of the pump unit, and closing the second valve a predetermined period of time after it has been opened, whereby the height of the vehicle can be increased. The second valve may first be opened, and the pump unit may start being actuated substantially simultaneously with the opening of the second valve. The first valve means may be opened no earlier than simultaneously with, or preferably a certain period of time after, the pump unit has started being actuated. The first fluid passage includes a third fluid passage leading to one of the front and rear dampers and a fourth fluid passage leading to the other of the front and rear dampers, the fourth fluid passage being shorter than the third fluid passage, and the first valve means comprising third and fourth valve means disposed in the third and fourth fluid passages, respectively. The method further comprises the steps of opening the third valve means, and opening the fourth valve means a predetermined period of time after the third valve means has been opened. When the vehicle height is to be lowered, the pump unit is de-activated, the second valve is opened, and thereafter the first valve means is opened.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a timing chart of operation of a discharge valve, a compressor, and a vehicle height adjusting valve at the time of increasing the vehicle height.

FIG. 3 is a timing chart of modified operation.

FIGS. 4(A) and 4(B) are graphs, each showing the relationship between the torque of a motor and a current supplied thereto, the graphs showing a comparison between a conventional method and a method of the present invention.

DETAILED DESCRIPTION OF THE PREFERRED EMBODIMENTS

Figure 1:
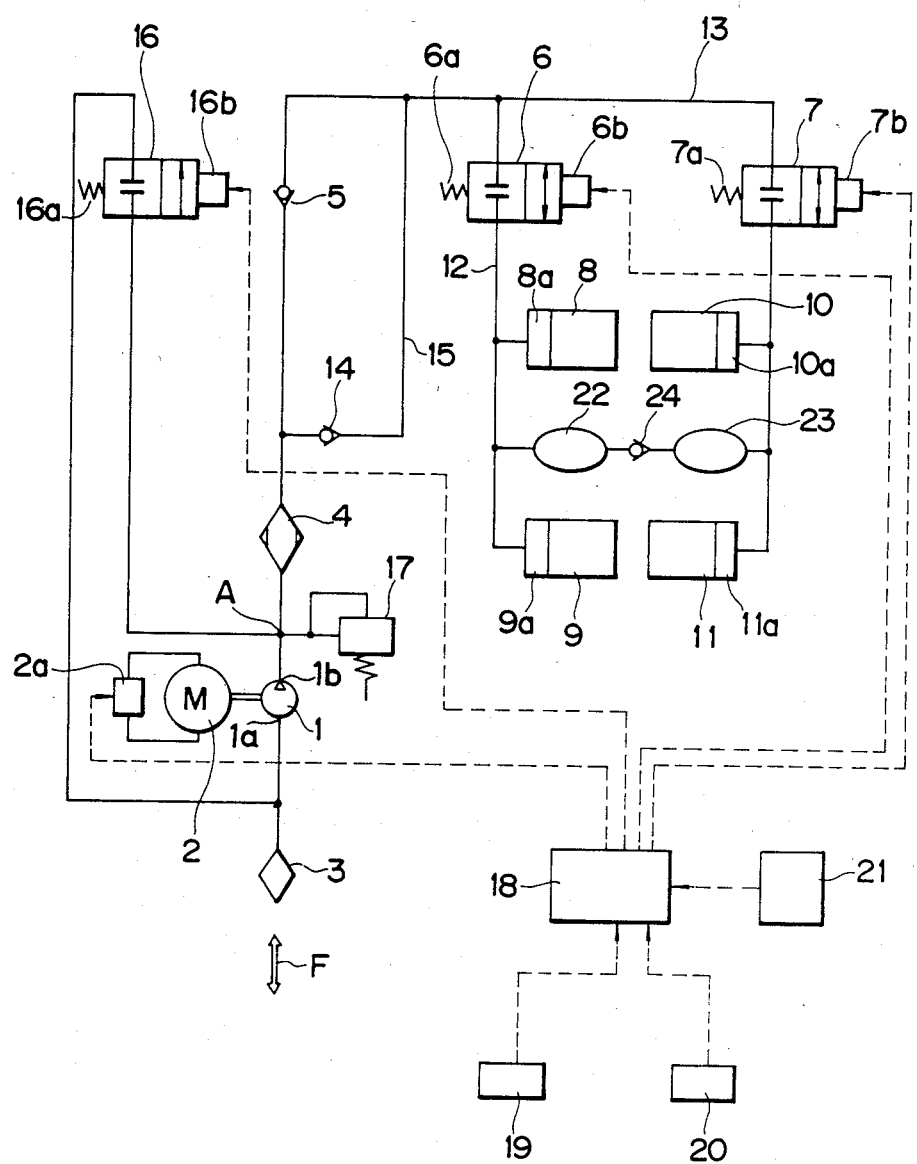
FIG. 1 is a circuit diagram of a pneumatic circuit of a vehicle height adjusting apparatus to which a method of the invention is applicable, and an electric control system for controlling the operation of components of the pneumatic circuit.

As shown in FIG. 1, a pneumatic system for controlling vehicle dampers includes a compressor 1 serving as a pump unit which is actuated in response to rotation of a motor 2 operatively connected to the compressor 1. The compressor 1 has an inlet port 1a connected to an inlet and outlet port 3 having a filter (not shown) and vented to the atmosphere. The compressor 1 also has an outlet port 1b connected through an air dryer 4, a check valve 5, and solenoid-operated valves 6, 7 normally held in a closed position by springs 6a, 6a, respectively, to front dampers 8, 9 and rear dampers 10, 11 via air passages 12, 13, respectively. The air dryer 4 serves to remove water content from air employed as a working fluid in the pneumatic system. The solenoid-operated valves 6, 7 have respective solenoids 6b, 7b which, when energized, cause the valves 6, 7 to open to allow air under pressure to pass therethrough in either direction. The valves 6, 7 thus serve as vehicle height adjusting valves. The dampers 8 through 11 are disposed as components of suspension units for front and rear wheels, respectively, for bearing loads imposed on the vehicle. The dampers 8 through 11 have air chambers 8a, 9a, 10a, 11a, respectively, capable of storing air under pressure therein, the air chambers being contractible and expandable for adjusting the vehicle height. The vehicle height is increased as the pressure in the air chambers is increased when air under pressure is supplied from the compressor 1.

Front and rear tanks 22, 23 are connected between the front dampers 8, 9 and the rear dampers 10, 11, with a check valve 24 interposed between the tanks 22, 23 for allowing air to pass from the rear tank 23 to the front tank 22. The tanks 22, 23 and the check valve 24 serve to normalize the pressure in the dampers 8 through 11.

A bypass air passage 15 is connected across the check valve 5 and has a check valve 14 oriented in a direction opposite to that of the check valve 5. Air under pressure is discharged from the dampers through the bypass air passage 15.

A branch joint A is connected to the outlet port 1b of the compressor 1. The branch joint A is coupled via a discharge passage to the inlet and outlet port 3 through a discharging solenoid-operated valve 16 which is normally held in a closed position by a spring 16a. A pressure relief drain valve 17 is also connected to the branch joint A for discharging an excessive air pressure.

The passage from the compressor 1 to the discharging valve 16, the passage from the compressor 1 to the air dryer 4, the dryer 4, and the passage from the air dryer 4 to the vehicle height adjusting valves 6, 7 jointly serve as an outlet chamber of the compressor 1. After the vehicle height has been adjusted to increase, the outlet chamber of the compressor 1 is under a pressurized condition.

An electric control system for controlling the pneumatic system comprises a control circuit 18 composed of a computer. The control system 18 is supplied with detected signals from vehicle height sensors 19, 20 disposed closely to the front and rear suspension units for detecting variations in the vehicle height based on relative positional changes of a suspended or sprung vehicle portion such as a vehicle body and a non-suspended or unsprung vehicle portion such as vehicle wheels, and also command signals from a control unit 21 capable of issuing various control commands. The control circuit 18 issues signals for controlling a power supply unit 2a for the motor 2, and solenoids 6b, 7b, 16b of the valves 6, 7, 16, respectively.

The pneumatic circuit thus constructed for the vehicle height adjusting apparatus will operate under the control of the control circuit 18.

For increasing the vehicle height, the control circuit 18 is responsive to detected signals from the vehicle height sensors 19, 20 and a command signal from the control unit 21 for issuing operation command signals to the motor power supply unit 2a and the solenoids 6b, 7b of the solenoid-operated valves 6, 7. An electric current then flows from the power supply unit 2a to energize the motor 2 for actuating the compressor 1. Air under pressure is now supplied through the solenoid-operated valves 6, 7 to the dampers 8 through 11 thereby increase the vehicle height. When the vehicle height reaches a reference level, the vehicle height sensors 19, 20 issue signals to the control circuit 18 which then generates signals to de-energize the solenoids 6b, 7b to close the solenoids 6, 7 and also de-activate the compressor 1. Therefore, the vehicle height adjustment is finished.

When the vehicle height is to be lowered, the vehicle height sensors 19, 20 or the control unit 21 issues a signal to the control circuit 18 which then applies signals to the solenoids 6b, 7b, 16b of the solenoid-operated valves 6, 7, 16, respectively. The solenoid-operated valves 6, 7, 16 are now opened to allow compressed air to be discharged through the bypass air passage 15, the solenoid-operated valve 16 and the inlet and outlet port 3. The vehicle height is lowered until it reaches the reference level, whereupon the vehicle height sensors 19, 20 and the control circuit 18 are actuated to close the solenoid-operated valves 6, 7, 16. The vehicle height adjustment is now completed.

Designated at F in FIG. 1 is the direction of flow of air into or out of the inlet and outlet port 3.

The amounts of air under pressure to be supplied to the respective dampers when increasing the vehicle height, and the amounts of air under pressure to be discharged from the respective dampers when reducing the vehicle height, are independently controlled and determined under the load conditions in which the front dampers 8, 9 and the rear dampers 10, 11 are placed. These amounts of pressurized air to be supplied and discharged are controlled by the detecting operation of the vehicle height sensors 19, 20 and the controlling operation of the control circuit 18.

When the compressor 1 is started to raise the vehicle level, the discharging solenoid-operated valve 16 is simultaneously opened for a certain period of time (1 second, for example) under the control of the control circuit 18. While the solenoid-operated valve 16 is open, any remaining air pressure in the pneumatic circuit, such as in the dampers 8 through 11, is allowed to be discharged through the check valve 14 and the solenoid-operated valve 16 out of the inlet and outlet port 3. Accordingly, the load which is imposed on the compressor 1 right after it has been started can be greatly reduced, and the compressor 1 can start its operation smoothly without being subjected to an undue load.

The discharging solenoid-operated valve 16 remains open until the rotation of the compressor 1 and hence the rotation of the motor 2 becomes continuous and the motor 2 produces a constant high torque. After the solenoid-operated valve 16 had been closed, air under pressure is supplied from the compressor 1 to each of the dampers 8 through 11.

Alternatively, the control circuit 18 may apply a signal to the solenoid 16b of the discharging valve 16 to open the latter for a certain period of time before the compressor 1 is started (B in FIG. 2), and after air under pressure has been discharged from the outlet chamber through the valve 16 and hence the pressure in the outlet chamber has been reduced, the valve 16 may be closed and at the same time the compressor 1 may be started (C in FIG. 2). The vehicle height adjusting valves 6, 7 are also opened simultaneously with the starting of the compressor 1 (D in FIG. 2).

As a further alternative, only the compressor 1 may be started when the valve 16 is closed, and upon elapse of a certain period of time, the valves 6, 7 may be opened, as shown in FIG. 3. Where the compressor 1 has an outlet chamber of a relatively large capacity, simultaneous starting of the compressor 1 and opening of the valves 6, 7 would permit air under compression to flow from the air chambers 8a, 9a, 10a, 11a of the dampers 8 through 11 back into the compressor outlet chamber, causing the vehicle height to be lowered temporarily. With the mode of operation shown in FIG. 3, however, the valves 6, 7 are kept closed for a period of time after the compressor 1 has started operating, so that any undesired temporary vehicle height reduction can be avoided. Since the pressure in the outlet chamber of the compressor has already been reduced to a sufficiently low level, the compressor 1 can start smoothly and quickly. The valves 6, 7 are opened at a time $t_1$ when the discharging capability of the compressor 1 is sufficiently high. Therefore, the compressor 1 can be operated without suffering from an excessive load for smooth vehicle height adjustment in the vehicle height adjusting apparatus.

With the foregoing mode of operation, the compressor 1 can be started smoothly even if the motor 2 is small in size and capable of producing only a small output.

FIG. 4(A) shows a graph schematically showing the relationship between the torque T (on horizontal axis) produced by the motor of the invention and a current I (on the vertical axis) supplied to the motor, and FIG. 4(B) illustrates a graph schematically showing the relationship between the torque T (on the horizontal axis) produced by the conventional motor and a current I (on the verticle axis) supplied to the motor. A comparison of FIGS. 4(A) and 4(B) clearly indicates that the motor operating in the mode of the invention can get the compressor 1 started with a smaller current supplied to the motor.

Figure 5:
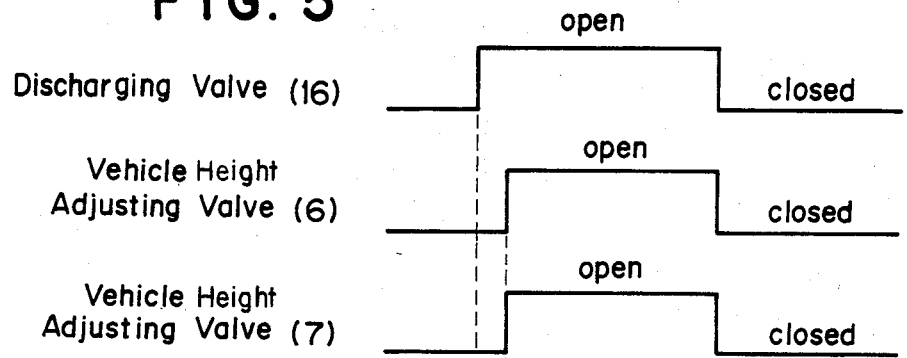
FIG. 5 is a timing chart of operation of the discharge valve and vehicle height adjusting valves at the time of reducing the vehicle height.

According to the method of the invention, when lowering the vehicle height from a higher level down to a reference level, the discharging solenoid-operated valve 16 is first opened, as shown in FIG. 5, and thereafter the solenoid-operated valves 6, 7 disposed in the air passages leading to the dampers are opened under the control of the control circuit 18. The pneumatic circuit is vented to the atmosphere as soon as the solenoid-operated valve 16 is opened, and air under higher pressure in the rear dampers 10, 11 does not flow into the front dampers 8, 9 of a lower air pressure, but is discharged out through the check valve 14 and the discharging solenoid-operated valve 16, when the solenoid-operated valves 6, 7 are simultaneously opened subsequent to the opening of the valve 16. As a consequence, the vehicle is free from any undesirable tendency of its height to get higher at the front portion than at the rear portion when the vehicle height is lowered as a whole, and the riding comfort will not be impaired.

The time $t_1$ by which the opening of the valves 6, 7 is delayed is determined to achieve a desired vehicle height adjustment mode most effectively.

Figure 6:
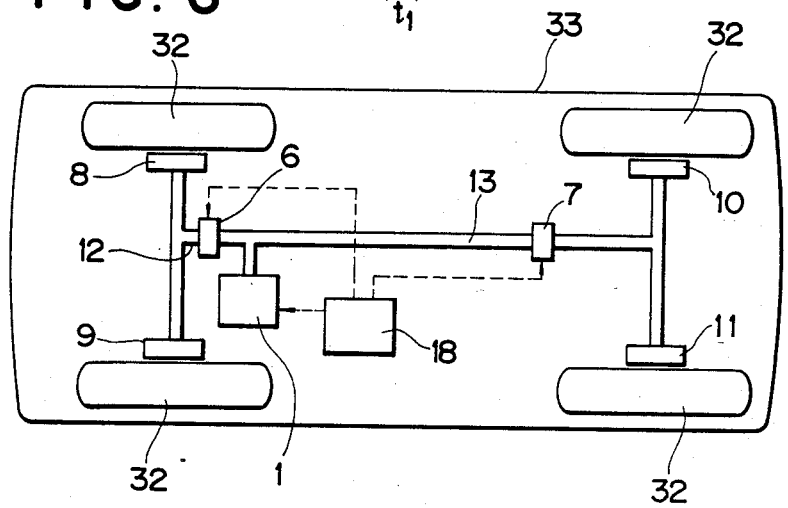
FIG. 6 is a bottom view of a vehicle, showing a compressor, air passages connected to front wheel dampers, and air passages connected to rear wheel dampers.
Figure 7:
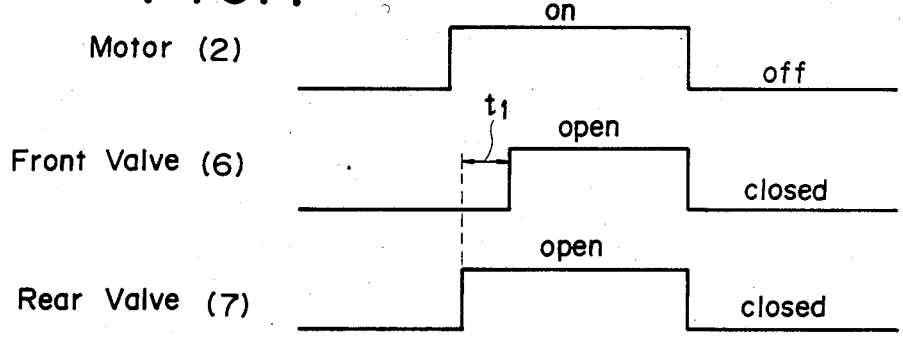
FIG. 7 is a timing chart showing operation of the compressor, the vehicle height adjusting valve for the front wheels, and the vehicle height adjusting valve for the rear wheels.

As illustrated in FIG. 6, the compressor 1 is positioned in a front portion, for example, of a vehicle body 33 having front and rear wheels 32. The compressor 1 is connected to the front wheel dampers 8, 9 through an air passage 12 and to the rear wheel dampers 10, 11 through an air pasage 13 which is longer than the air passage 12.

Vehicle height adjustment with the arrangement of FIG. 6 is effected according to a mode shown in FIG. 3. More specifically, the motor 2 is energized to operate the compressor 1 for supplying air under pressure, and then with a certain time delay the valve 7 in the air passage 13 is opened. Then, with a further time delay $t_1$, the valve 6 in the air passage 13 is opened. Air under pressure is therefore first supplied through the valve 7 to the rear wheel dampers 10, 11, tending to develop a higher pressure buildup in the rear wheel dampers 10, 11 commensurate with the time $t_1$. However, since the air passage 13 is longer than the air passage 12 and has a larger resistance to air flow than that of the air passage 12, the air pressure admitted in the air passage 13 before the valve 6 is opened is cancelled out to the extent that the air pressures in the front and rear wheel dampers 8, 9 and 10, 11 are automatically adjusted as required to keep the front and rear portion of the vehicle at an even level or height. The delay time $t_1$ is determined dependent on the difference between the lengths of the air passages 12, 13.

When any vehicle height adjustment has been brought to an end, the control circuit 18 issues signals to the motor power supply 2a and the solenoids 6b, 7b of the valves 6, 7 to de-energize the motor 2 and close the valves 6, 7. Thus, the vehicle height adjusting control is completed.

The above method of the present invention can be applied to vehicle height adjusting apparatus in which a source of air under pressure is located off center at a front or a rear vehicle portion, tending to cause the vehicle height to differ at the front and rear vehicle portions due to the difference between the lengths of air passages leading to front and rear dampers.

While the present invention has been shown and described as being incorporated in a vehicle height adjusting apparatus having a pneumatic circuit, the invention is equally applicable to vehicle height adjusting apparatus having a hydraulic circuit.

The present invention has the following advantages:
(1) The load imposed on the motor is reduced when the compressor is started at the time the vehicle height is increased by the vehicle height adjusting apparatus. Therefore, the compressor can be started smoothly by a small-size motor capable of producing a low output.
(2) The above advantage can be achieved simply and inexpensively without changing the compressor structurally and functionally.
(3) Because of the reduction in the load on the compressor, the motor can drive a compressor having a greater discharging capacity. The current which flows through the motor when starting the compressor is reduced, so that the motor can have an increased degree of durability.
(4) When the vehicle height is to be lowered after it has been increased, no air under higher pressure flows from the rear dampers into the front dampers. The vehicle height can thus be lowered to a predetermined level at equal rates at the front and rear portions of the vehicle, so that the vehicle height adjustment is rendered stable.
(5) The dampers can be supplied with air under pressure to keep the vehicle height equalized at the front and rear portions thereof even if the air passages leading to the front and rear wheel dampers have different lengths.

Although there have been described what are at present considered to be the preferred embodiments of the present invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

What is claimed is:

1. A method of operating a vehicle height adjusting apparatus including a vehicle body having front and rear wheels, contractible and extensible dampers disposed between said front and rear wheels and said vehicle body, a motor, a pump unit having inlet and outlet ports and drivable by said motor for supplying a working fluid under pressure to said dampers, first valve means disposed in a first fluid passage between said pump unit and said dampers for adjusting the height of said vehicle, and second valve means disposed in a second fluid passage between said inlet and outlet ports of said pump unit and connected to said first fluid passage for discharging the fluid from said dampers to said outlet port of said pump unit, said method comprising the steps of:
(a) starting said pump unit to actuate same;
(b) opening said second valve means no later than simultaneously with the starting of actuation of said pump unit; and
(c) closing said second valve means a predetermined period of time after it has been opened, whereby the height of said vehicle can be increased.

2. A method according to claim 1, wherein said second valve means is first opened, said pump unit starts to be actuated substantially simultaneously with the opening of said second valve means, and said second valve means is closed said predetermined period of time after it has been opened.

3. A method according to claim 1, wherein said second valve means is first opened, said second valve means is closed said predetermined period of time after it has been opened, said pump unit starts to be actuated substantially simultaneously with the closing of said second valve means.

4. A method according to claim 3, wherein said first valve means is opened no earlier than simultaneously with the starting of actuation of said pump unit.

5. A method according to claim 4, wherein said first valve means is opened a predetermined period of time after said pump unit has started to be actuated.

6. A method according to claim 4, for operating a vehicle height adjusting apparatus in which said first fluid passage includes a third fluid passage leading to one of said front and rear dampers and a fourth fluid passage leading to the other of said front and rear dampers, said fourth fluid passage being shorter than said third fluid passage, and said first valve means comprising third and fourth valves disposed in said third and fourth fluid passages, respectively, said method comprising the steps of:
 (a) opening said third valve; and
 (b) opening said fourth valve a predetermined period of time after said third valve has been opened.

7. A method according to claim 1, further including the steps of inactivating said pump unit, opening said second valve means, and thereafter opening said first valve means, whereby the height of said vehicle can be lowered.

* * * * *